US012795255B2

(12) United States Patent
Yamamoto et al.

(10) Patent No.: US 12,795,255 B2
(45) Date of Patent: Nov. 10, 2026

(54) DISTANCE IMAGE CAPTURING DEVICE AND DISTANCE IMAGE CAPTURING METHOD

(71) Applicant: TOPPAN Holdings Inc., Tokyo (JP)

(72) Inventors: Kazuto Yamamoto, Tokyo (JP); Tomohiro Nakagome, Tokyo (JP)

(73) Assignee: TOPPAN HOLDINGS INC., Tokyo (JP)

( * ) Notice: Subject to any disclaimer, the term of this patent is extended or adjusted under 35 U.S.C. 154(b) by 9 days.

(21) Appl. No.: 19/039,329

(22) Filed: Jan. 28, 2025

(65) Prior Publication Data

US 2025/0247636 A1 Jul. 31, 2025

(30) Foreign Application Priority Data

Jan. 31, 2024 (JP) ................................ 2024-012718

(51) Int. Cl.
*H04N 25/58* (2023.01)
*H04N 25/77* (2023.01)

(52) U.S. Cl.
CPC ............. *H04N 25/58* (2023.01); *H04N 25/77* (2023.01)

(58) Field of Classification Search
CPC ....... H04N 25/58; H04N 25/705; H04N 25/77
See application file for complete search history.

(56) References Cited

U.S. PATENT DOCUMENTS

2006/0192938 A1 8/2006 Kawahio
2013/0162973 A1* 6/2013 Kamiyama ........... G01S 7/4913 356/5.01
2020/0278194 A1* 9/2020 Kawahito ............... G01S 17/10
2023/0281957 A1* 9/2023 Nagase ................. G01S 17/894 382/106
2023/0358863 A1* 11/2023 Takahashi ................ G01C 3/06
2026/0029535 A1* 1/2026 Shirakawa .............. G01S 17/10

FOREIGN PATENT DOCUMENTS

JP 4235729 3/2009

* cited by examiner

*Primary Examiner* — Antoinette T Spinks
(74) *Attorney, Agent, or Firm* — STAAS & HALSEY LLP

(57) ABSTRACT

A distance image capturing device includes a light source unit, a light receiving unit including a pixel having a photoelectric conversion element and three or more charge accumulation units and a pixel driving circuit distributing and accumulating charge in each charge accumulation unit, and a distance image processing unit that controls an irradiation timing and an accumulation timing, measures a distance to an object based on an amount of charge accumulated, and generates a distance image. The distance image processing unit combines a first distance image generated by controlling the light source unit and the pixel driving circuit under predetermined measurement conditions, a second distance image generated by changing the predetermined measurement conditions such that the amount of charge accumulated is reduced, and a third distance image generated by delaying the accumulation timing such that charge caused by a flare is not accumulated in the charge accumulation unit under the predetermined measurement conditions to generate the distance image.

10 Claims, 10 Drawing Sheets

DISTANCE IMAGE CAPTURING DEVICE AND DISTANCE IMAGE CAPTURING METHOD

BACKGROUND OF THE INVENTION

Field of the Invention

The present invention relates to a distance image capturing device and a distance image capturing method.

Priority is claimed on Japanese Patent Application No. 2024-012718, filed on Jan. 31, 2024, the content of which is incorporated herein by reference.

Description of Related Art

A distance image capturing device of a time-of-flight (TOF) type that measures a distance between a measurement device and an object based on a flight time of light in space (measurement space) using the speed of light, which is known, has been achieved (for example, see Japanese Patent No. 4235729).

However, in the above-described distance image capturing device according to the related art, in a case where a short-distance object is imaged with high power, a flare may occur, and the accuracy of measuring the distance may be reduced due to the flare. Here, the flare is a phenomenon in which reflected light from the short-distance object is re-reflected from a surface of a sensor, diffuse reflection occurs between a lens and the sensor, and noise that particularly reduces the accuracy of measuring the distance of a long-distance object occurs.

In addition, in the distance image capturing device according to the related art, the generation of a distance image by high dynamic range (HDR) is performed in order to accurately measure the distance between a high-reflectivity object and a low-reflectivity object in a situation in which the high-reflectivity object and the low-reflectivity object are present at the same distance. Here, the HDR is a method that combines a distance image captured by driving in which the power of a light source is high or the number of times charge is accumulated is large and a distance image captured by driving in which the power of a light source is low or the number of times charge is accumulated is small.

However, in the distance image capturing device according to the related art, for example, even in a case where the distance image is generated by the HDR in a situation where the high-reflectivity object and the low-reflectivity object are present at the same distance, it is difficult to suppress the influence of the flare occurring in the distance image imaged under the conditions of the high power of the light source or the larger number of times charge is accumulated.

The present invention has been made in order to solve the above-described problems, and an object of the present invention is to provide a distance image capturing device and a distance image capturing method that can suppress an influence of a flare to improve the accuracy of distance measurement in a situation in which a high-reflectivity object and a low-reflectivity object are present at the same distance.

SUMMARY OF THE INVENTION

In order to achieve the object, according to an aspect of the present invention, there is provided a distance image capturing device including: a light source unit that irradiates a measurement space, which is a measurement target space, with a light pulse; a light receiving unit that includes a pixel having a photoelectric conversion element which generates charge corresponding to incident light and three or more charge accumulation units which accumulate the charge and a pixel driving circuit which distributes and accumulates the charge in each of the charge accumulation units in the pixel at a timing synchronized with the irradiation with the light pulse by a frame period; and a distance image processing unit that controls an irradiation timing when the light pulse is emitted and an accumulation timing when the charge is distributed and accumulated in each of the charge accumulation units, measures a distance to an object that is present in the measurement space based on an amount of charge accumulated in each of the charge accumulation units, and generates a distance image. The distance image processing unit combines a first distance image generated by controlling the light source unit and the pixel driving circuit under predetermined measurement conditions of an irradiation output of the light pulse and the number of times the charge is accumulated in the charge accumulation unit, a second distance image generated by changing the predetermined measurement conditions such that the amount of charge accumulated is reduced, and a third distance image generated by delaying the accumulation timing such that charge caused by a flare is not accumulated in the charge accumulation unit under the predetermined measurement conditions to generate the distance image.

In addition, according to another aspect of the present invention, in the above-described distance image capturing device, the distance image processing unit may combine the first distance image and the second distance image using high dynamic range (HDR) to generate an HDR distance image, determine whether or not each pixel is a short-distance pixel whose distance is equal to or less than a threshold value, select a pixel value of the HDR distance image in a case where the pixel is the short-distance pixel, select a pixel value of the third distance image in a case where the pixel is not the short-distance pixel, but is a long-distance pixel, and combine the pixel values to generate the distance image.

Further, according to still another aspect of the present invention, in the above-described distance image capturing device, in a case where a distance calculation error occurs for each pixel of the third distance image, the distance image processing unit may determine that the pixel of the third distance image is the short-distance pixel and select the pixel value of the HDR distance image for the pixel.

Furthermore, according to yet another aspect of the present invention, in the above-described distance image capturing device, the distance image processing unit may determine whether or not each pixel of the first distance image is a short-distance low-reflectivity object based on the amount of charge accumulated in each of the charge accumulation units and further select the pixel value of the HDR distance image for a pixel corresponding to the short-distance low-reflectivity object in the first distance image.

Moreover, according to still yet another aspect of the present invention, in the above-described distance image capturing device, the distance image processing unit may reduce an irradiation intensity of the light pulse or the number of times the charge is accumulated from the predetermined measurement conditions to generate the second distance image.

In addition, according to yet still another aspect of the present invention, in the above-described distance image capturing device, the frame period may include a plurality of sub-frame periods configured by an accumulation period and a reading period for reading the amount of charge accumulated in the charge accumulation unit during the accumulation period, and the plurality of sub-frame periods may include a first sub-frame period for generating the first distance image, a second sub-frame period for generating the second distance image, and a third sub-frame period for generating the third distance image.

Further, according to still yet another aspect of the present invention, there is provided a distance image capturing method in a distance image capturing device including a light source unit that irradiates a measurement space, which is a measurement target space, with a light pulse, a light receiving unit that includes a pixel having a photoelectric conversion element which generates charge corresponding to incident light and three or more charge accumulation units which accumulate the charge and a pixel driving circuit which distributes and accumulates the charge in each of the charge accumulation units in the pixel at a timing synchronized with the irradiation with the light pulse by a frame period, and a distance image processing unit that controls an irradiation timing when the light pulse is emitted and an accumulation timing when the charge is distributed and accumulated in each of the charge accumulation units, measures a distance to an object that is present in the measurement space based on an amount of charge accumulated in each of the charge accumulation units, and generates a distance image. The distance image capturing method includes: a first generation step of causing the distance image processing unit to control the light source unit and the pixel driving circuit under predetermined measurement conditions of an irradiation output of the light pulse and the number of times the charge is accumulated in the charge accumulation unit to generate a first distance image; a second generation step of causing the distance image processing unit to change the predetermined measurement conditions such that the amount of charge accumulated is reduced to generate a second distance image; a third generation step of causing the distance image processing unit to delay the accumulation timing such that charge caused by a flare is not accumulated in the charge accumulation unit under the predetermined measurement conditions to generate a third distance image; and a combination step of causing the distance image processing unit to combine the first distance image, the second distance image, and the third distance image to generate the distance image.

According to the present invention, it is possible to suppress the influence of a flare to improve the accuracy of distance measurement in a situation in which a high-reflectivity object and a low-reflectivity object are present at the same distance.

DETAILED DESCRIPTION OF THE INVENTION

Hereinafter, a distance image capturing device and a distance image capturing method according to an embodiment of the present invention will be described with reference to the drawings.

Figure 1:
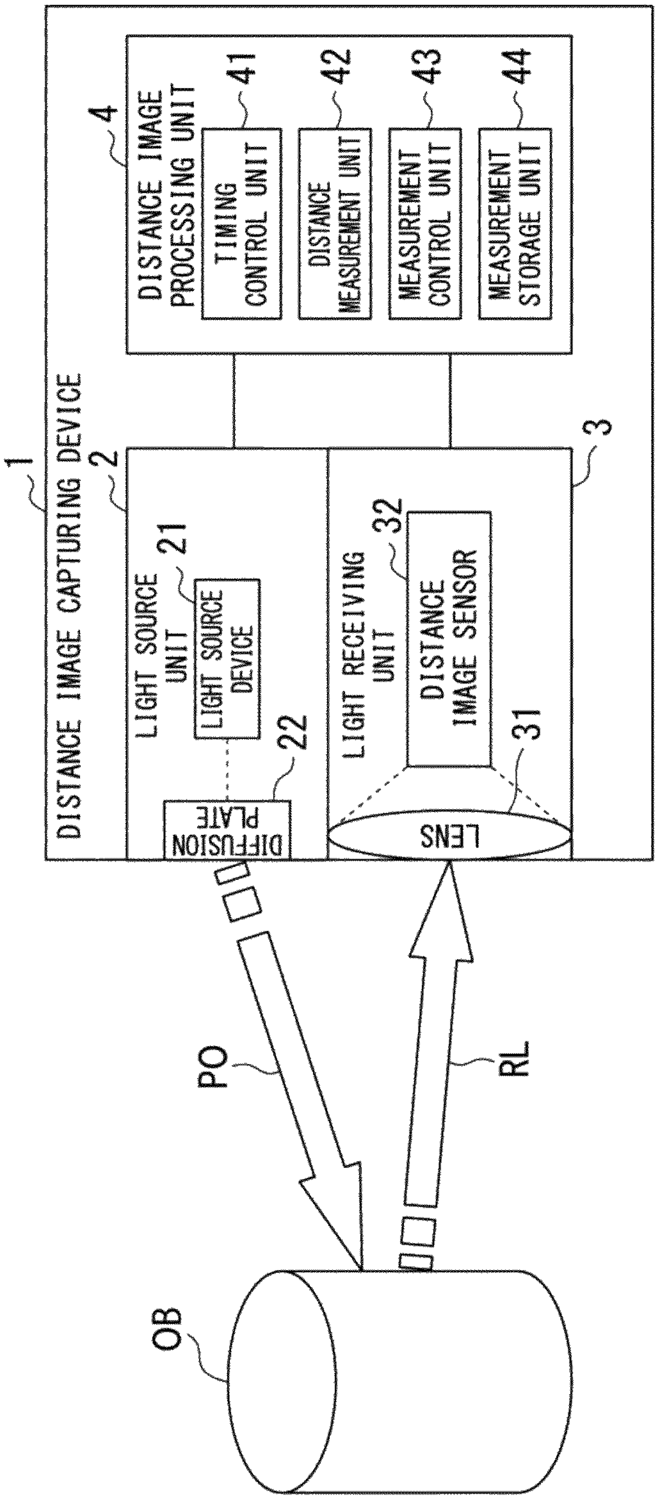
FIG. 1 is a block diagram showing a schematic configuration of a distance image capturing device according to the present embodiment.

FIG. 1 is a block diagram showing a schematic configuration of a distance image capturing device 1 according to the present embodiment.

As shown in FIG. 1, the distance image capturing device 1 includes a light source unit 2, a light receiving unit 3, and a distance image processing unit 4. In addition, FIG. 1 also shows an object OB to which the distance is to be measured by the distance image capturing device 1.

The light source unit 2 irradiates a measurement target space, in which the object OB to which the distance is to be measured by the distance image capturing device 1 is present, with a light pulse PO under the control of the distance image processing unit 4. The light source unit 2 is, for example, a surface-emitting semiconductor laser module such as a vertical cavity surface emitting laser (VCSEL). The light source unit 2 includes a light source device 21 and a diffusion plate 22.

The light source device 21 is a light source that emits laser light in a near-infrared wavelength band (for example, a wavelength band of a wavelength of 850 nm to 940 nm) which becomes the light pulse PO with which the object OB is to be irradiated. The light source device 21 is, for example, a semiconductor laser light emitting element. The light source device 21 emits pulsed laser light under the control of a timing control unit 41.

The diffusion plate 22 is an optical component that diffuses the laser light in the near-infrared wavelength band emitted by the light source device 21 to a size of a surface for irradiating the object OB with the laser light. The pulsed laser light diffused by the diffusion plate 22 is emitted as the light pulse PO, and the object OB is irradiated with the pulsed laser light.

The light receiving unit 3 receives reflected light RL of the light pulse PO reflected by the object OB to which the distance is to be measured by the distance image capturing device 1 and outputs a pixel signal corresponding to the received reflected light RL. The light receiving unit 3 includes a lens 31 and a distance image sensor 32.

The lens 31 is an optical lens that guides the incident reflected light RL to the distance image sensor 32. The lens 31 emits the incident reflected light RL to the distance image sensor 32 such that the reflected light RL is received by (incident on) pixels provided in a light receiving region of the distance image sensor 32.

The distance image sensor 32 is an imaging element used in the distance image capturing device 1. The distance image sensor 32 includes a plurality of pixels provided in a two-dimensional light receiving region. Each of the pixels of the distance image sensor 32 is provided with one photoelectric conversion element, a plurality of charge accumulation units corresponding to the one photoelectric conversion element, and a component that distributes charge to each of the charge accumulation units. That is, the pixel is an imaging element having a distribution configuration in which charge is distributed and accumulated in a plurality of (for example, three or more) charge accumulation units.

The distance image sensor 32 distributes the charge generated by the photoelectric conversion element to each of the charge accumulation units under the control of the timing control unit 41. In addition, the distance image sensor 32 outputs the pixel signal corresponding to the amount of charge distributed to the charge accumulation unit. A plurality of pixels are arranged in a two-dimensional matrix in the distance image sensor 32, and a pixel signal that corresponds to one frame corresponding to each pixel is output.

The distance image processing unit 4 controls the distance image capturing device 1 such that the distance to the object OB is calculated. The distance image processing unit 4 includes the timing control unit 41, a distance measurement unit 42, a measurement control unit 43, and a measurement storage unit 44.

The timing control unit 41 controls the timing when various control signals required for measurement are output under the control of the measurement control unit 43. Here, examples of the various control signals include a signal for controlling irradiation with the light pulse PO, a signal for distributing and accumulating charge in each of charge accumulation units CS in a pixel 321 at a timing synchronized with the irradiation with the light pulse PO by a frame period (a signal for distributing the reflected light RL to a plurality of charge accumulation units), a signal for controlling the number of distribution operations (the number of times charge is accumulated) per frame. The number of distribution operations (the number of times charge is accumulated) is the number of repetitions of a process of distributing the charge to the charge accumulation unit CS (see FIG. 3). A product of the number of distribution operations and the time (accumulation time) for which the charge is accumulated in each charge accumulation unit per charge distribution process is an exposure time.

The distance measurement unit 42 outputs distance information obtained by calculating the distance to the object OB based on the pixel signal output from the distance image sensor 32. The distance measurement unit 42 calculates a delay time from the irradiation with the light pulse PO to the reception of the reflected light RL based on the amount of charge accumulated in a plurality of (for example, three or more) charge accumulation units. The distance measurement unit 42 calculates the distance to the object OB according to the calculated delay time. In addition, the details of the measurement of the distance to the object OB by the distance measurement unit 42 will be described below.

The measurement control unit 43 controls the timing control unit 41 and the distance measurement unit 42. For example, the measurement control unit 43 sets the number of times one frame is distributed and the accumulation time and controls the timing control unit 41 such that imaging is performed according to the set content.

The measurement control unit 43 directs the distance measurement unit 42 to execute the process of measuring the distance to the object OB based on the result of the imaging executed by the timing control unit 41. In addition, the measurement control unit 43 generates a distance image based on the measured distance to the object OB and outputs the distance image. Here, the distance image is an image in which a pixel value corresponding to a measurement value (a value of the distance) measured by the distance measurement unit 42 has been inserted into each pixel.

Further, the frame period (a period of one frame) for generating the distance image includes a plurality of sub-frame periods configured by an accumulation period and a reading period for reading the amount of charge accumulated in the charge accumulation unit CS during the accumulation period. The plurality of sub-frame periods include a first sub-frame period, a second sub-frame period, and a third sub-frame period.

In the first sub-frame period, under predetermined measurement conditions, the measurement control unit 43 controls the light source unit 2 and a pixel driving circuit (vertical scanning circuit 323) using the timing control unit 41 and measures the distance using the distance measurement unit 42 to generate a first distance image. In addition, the predetermined measurement conditions (predetermined driving conditions) include irradiation power (irradiation output) of the light pulse PO and the number of times charge is accumulated in the charge accumulation unit CS. For example, the number of times charge is accumulated is 100,000. In addition, the first sub-frame period is a sub-frame period for generating the first distance image.

In addition, in the second sub-frame period, the measurement control unit 43 changes the predetermined measurement conditions such that the amount of charge accumulated is reduced, controls the light source unit 2 and the pixel driving circuit (vertical scanning circuit 323) using the timing control unit 41, and measures the distance using the distance measurement unit 42 to generate a second distance image. Here, the predetermined measurement condition in which the amount of charge accumulated is reduced is, for example, a condition in which the number of times charge is accumulated is reduced to 10,000. In addition, the second sub-frame period is a sub-frame period for generating the second distance image.

Further, in the third sub-frame period, the measurement control unit 43 delays the accumulation timing such that charge caused by a flare is not accumulated in the charge accumulation unit CS under the predetermined measurement conditions, controls the light source unit 2 and the pixel driving circuit (vertical scanning circuit 323) using the timing control unit 41, and measures the distance using the distance measurement unit 42 to generate a third distance image. That is, the measurement control unit 43 performs range shift driving to generate the third distance image in the third sub-frame period. In addition, the third sub-frame period is a sub-frame period for generating the third distance image.

The measurement control unit 43 combines the first distance image generated in the first sub-frame period, the second distance image generated in the second sub-frame period, and the third distance image generated in the third sub-frame period to generate a final distance image. Further, the details of the process of generating the first distance image, the second distance image, and the third distance image and the process of combining the final distance image by the measurement control unit 43 will be described below.

The measurement storage unit 44 stores various types of information used by the distance image processing unit 4 to measure the distance to the object OB and to generate the distance image. The measurement storage unit 44 stores, for example, the amount of charge accumulated in the charge accumulation unit CS of each pixel, the first distance image, the second distance image, the third distance image, and the final distance image.

With the configuration shown in FIG. 1, in the distance image capturing device 1, the light source unit 2 irradiates the object OB with the light pulse PO in the near-infrared wavelength band, the light receiving unit 3 receives the reflected light RL of the light pulse PO reflected by the object OB, and the distance image processing unit 4 outputs the distance information (for example, the distance image) obtained by measuring the distance to the object OB.

In addition, FIG. 1 shows the distance image capturing device 1 having the distance image processing unit 4 provided therein. However, the distance image processing unit 4 may be a component that is provided outside the distance image capturing device 1.

Next, a configuration of the distance image sensor 32 used as the imaging element in the distance image capturing device 1 will be described.

Figure 2:
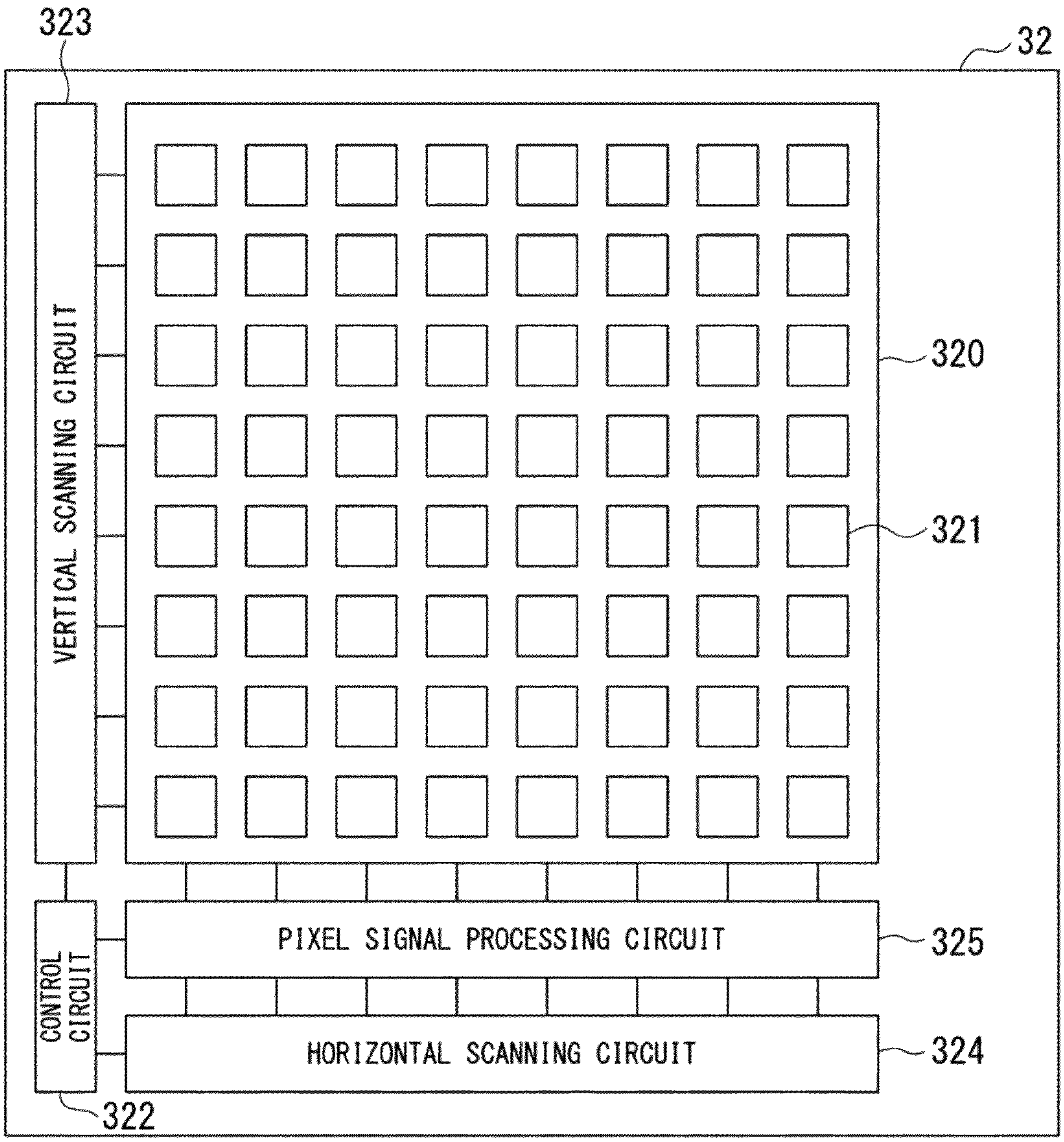
FIG. 2 is a block diagram showing a schematic configuration of a distance image sensor in the present embodiment.

FIG. 2 is a block diagram showing a schematic configuration of the distance image sensor 32 in the present embodiment.

As shown in FIG. 2, the distance image sensor 32 includes, for example, a light receiving region 320 in which a plurality of pixels 321 are arranged, a control circuit 322, the vertical scanning circuit 323 having a distribution operation, a horizontal scanning circuit 324, and a pixel signal processing circuit 325.

The light receiving region 320 is a region in which the plurality of pixels 321 are arranged, and FIG. 2 shows an example in which the plurality of pixels 321 are arranged in a two-dimensional matrix of eight rows and eight columns.

The pixel 321 accumulates the charge corresponding to the amount of light received.

The control circuit 322 controls the overall operation of the distance image sensor 32. For example, the control circuit 322 controls the operations of the components of the distance image sensor 32 in response to an instruction from the timing control unit 41 of the distance image processing unit 4. In addition, the timing control unit 41 may directly control the components included in the distance image sensor 32. In this case, the control circuit 322 can be omitted.

The vertical scanning circuit 323 is a circuit that controls the pixels 321 arranged in the light receiving region 320 in units of rows under the control of the control circuit 322. The vertical scanning circuit 323 outputs a voltage signal corresponding to the amount of charge accumulated in each of the charge accumulation units CS of the pixel 321 to the pixel signal processing circuit 325. In this case, the vertical scanning circuit 323 distributes the charge converted by the photoelectric conversion element to each of the charge accumulation units of the pixel 321. That is, the vertical scanning circuit 323 is an example of the "pixel driving circuit".

The pixel signal processing circuit 325 is a circuit that performs predetermined signal processing (for example, a noise suppression process, an A/D conversion process, or the like) on the voltage signal output from the pixels 321 in each column to a corresponding vertical signal line under the control of the control circuit 322.

The horizontal scanning circuit 324 is a circuit that sequentially outputs the signals output from the pixel signal processing circuit 325 to horizontal signal lines under the control of the control circuit 322. Therefore, the pixel signal corresponding to the amount of charge accumulated for one sub-frame period is sequentially output to the distance image processing unit 4 via the horizontal signal line.

In the following description, it is assumed that the pixel signal processing circuit 325 performs the A/D conversion process and the pixel signal is a digital signal.

Here, the configuration of the pixels 321 arranged in the light receiving region 320 provided in the distance image sensor 32 will be described.

Figure 3:
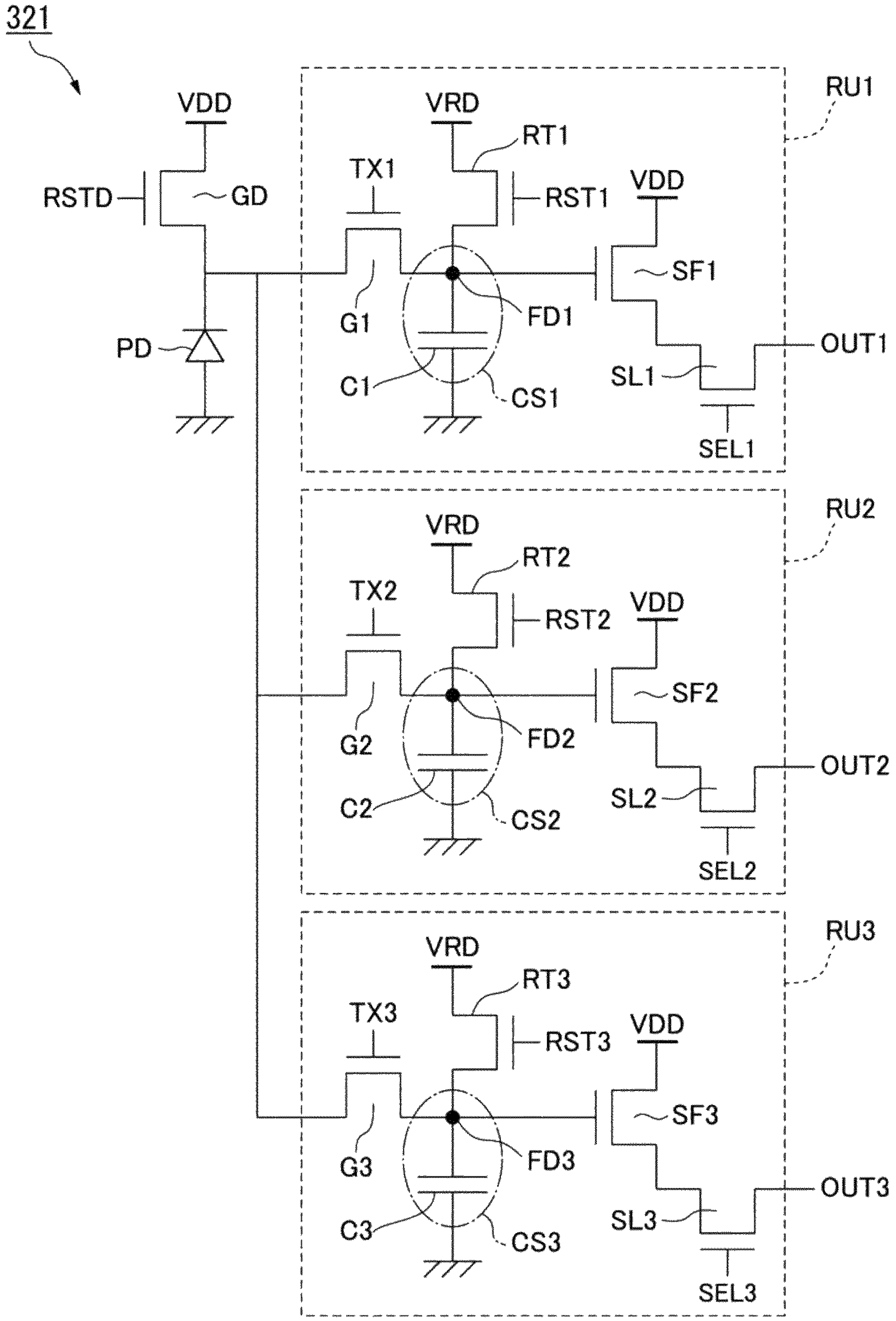
FIG. 3 is a circuit diagram showing an example of a configuration of pixels of the distance image capturing device according to the present embodiment.

FIG. 3 is a circuit diagram showing an example of the configuration of the pixel 321 in the distance image capturing device 1 according to the present embodiment.

FIG. 3 shows an example of the configuration of one pixel 321 among the plurality of pixels 321 arranged in the light receiving region 320.

The pixel 321 is an example of a configuration including three pixel signal readout units.

The pixel 321 includes one photoelectric conversion element PD, a drain gate transistor GD (charge discharge transistor), and three pixel signal readout units RU that output the voltage signals from corresponding output terminals OUT.

Each of the pixel signal readout units RU includes a readout gate transistor G, a floating diffusion FD, a charge accumulation capacitor C, a reset gate transistor RT, a source follower gate transistor SF, and a select gate transistor SL. In each of the pixel signal readout units RU, the floating diffusion FD and the charge accumulation capacitor C constitute the charge accumulation unit CS.

Further, in FIG. 3, the pixel signal readout units RU are distinguished from each other by adding numbers "1", "2", and "3" after letters "RU" of the three pixel signal readout units RU. In addition, similarly, for the components provided in the three pixel signal readout units RU, the numbers indicating the pixel signal readout units RU are given after letters indicating the components to distinguish the pixel signal readout units RU corresponding to the respective components.

In the pixel 321 shown in FIG. 3, a pixel signal readout unit RU1 that outputs the voltage signal from an output terminal OUT1 includes a readout gate transistor G1, a floating diffusion FD1, a charge accumulation capacitor C1, a reset gate transistor RT1, a source follower gate transistor SF1, and a select gate transistor SL1. In the pixel signal readout unit RU1, the floating diffusion FD1 and the charge accumulation capacitor C1 constitute a charge accumulation unit CS1. A pixel signal readout unit RU2 and a pixel signal readout unit RU3 also have the same configuration as described above. The charge accumulation unit CS1 is an example of a "first charge accumulation unit". The charge accumulation unit CS2 is an example of a "second charge accumulation unit". The charge accumulation unit CS3 is an example of a "third charge accumulation unit".

The photoelectric conversion element PD is an embedded photodiode that performs photoelectric conversion on incident light to generate charge and accumulates the generated charge. The photoelectric conversion element PD may have any structure. The photoelectric conversion element PD may be, for example, a PN photodiode having a structure in which a P-type semiconductor and an N-type semiconductor are bonded together or a PIN photodiode having a structure in which an I-type semiconductor is interposed between the P-type semiconductor and the N-type semiconductor. In addition, the photoelectric conversion element PD is not limited to the photodiode and may be, for example, a photogate-type photoelectric conversion element.

In the pixel 321, the charge generated by the photoelectric conversion of the incident light by the photoelectric conversion element PD is distributed to each of three charge accumulation units CS, and each voltage signal corresponding to the amount of distributed charge is output to the pixel signal processing circuit 325.

The configuration of the pixels arranged in the distance image sensor 32 is not limited to the configuration shown in FIG. 3 including the three pixel signal readout units RU. The pixel may be any pixel configured to include a plurality of pixel signal readout units RU. That is, the number of pixel signal readout units RU (charge accumulation units CS) included in the pixel arranged in the distance image sensor 32 may be four or more.

In addition, an example in which the charge accumulation unit CS is configured by the floating diffusion FD and the charge accumulation capacitor C in the pixel 321 having the configuration shown in FIG. 3 is shown. However, the charge accumulation unit CS may be configured by at least the floating diffusion FD, and the pixel 321 may not include the charge accumulation capacitor C.

In addition, an example in which the pixel 321 having the configuration shown in FIG. 3 includes the drain gate transistor GD is shown. However, in a case where it is not necessary to discard the charge accumulated (remaining) in the photoelectric conversion element PD, the pixel 321 may be configured not to include the drain gate transistor GD.

Next, the driving timing of the distance measurement in the sub-frame period of the distance image capturing device 1 according to the present embodiment will be described with reference to FIG. 4.

Figure 4:
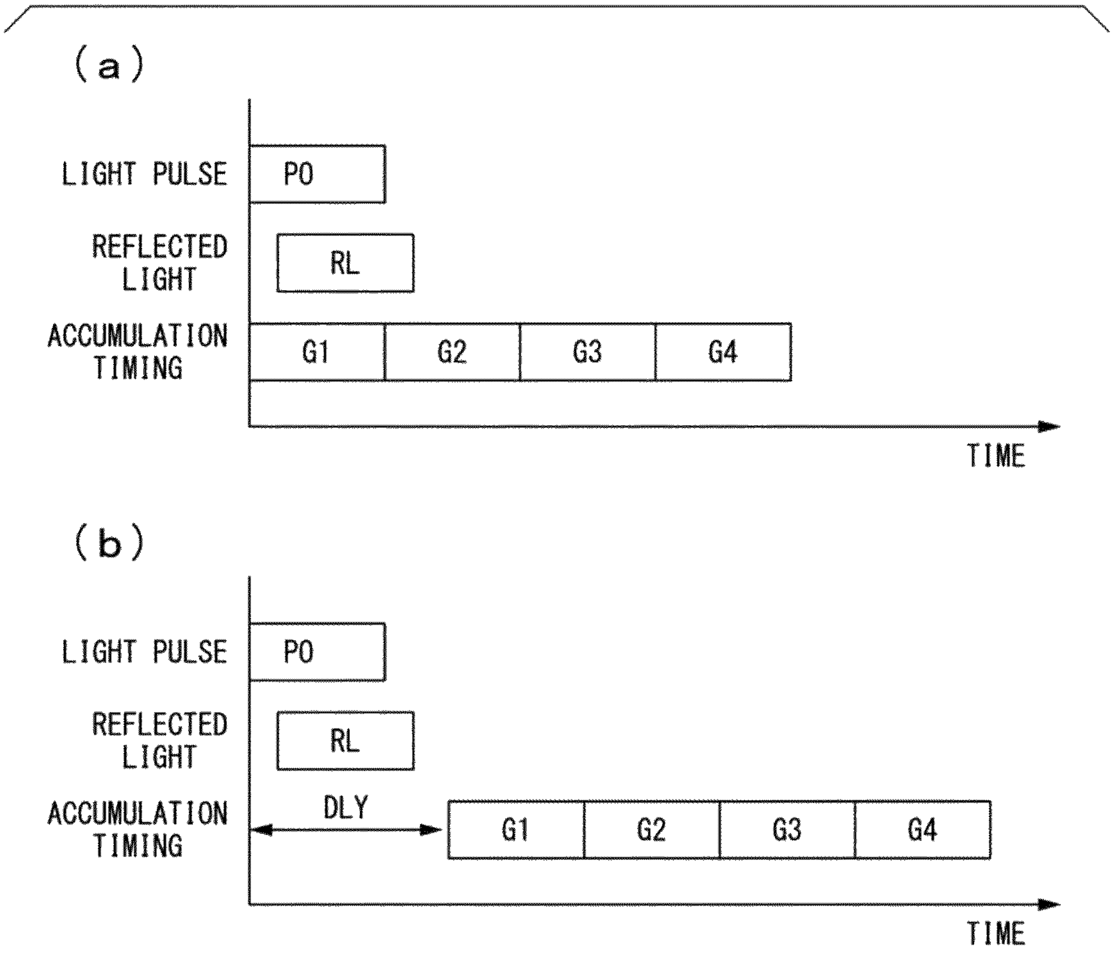
FIG. 4 is a diagram showing an example of a driving timing of distance measurement in a sub-frame period of the distance image capturing device according to the present embodiment.

FIG. 4 is a diagram showing an example of the driving timing of the distance measurement in the sub-frame period of the distance image capturing device 1 according to the present embodiment. In FIG. 4, an example of a case where there are four charge accumulation units CS and the object OB is present at a close distance will be described.

In FIG. 4, the timing when the light pulse PO is emitted is represented by an item name "PO", the timing when the reflected light is received is represented by an item name "RL", the timing of a driving signal TX1 is represented by an item name "G1", the timing of a driving signal TX2 is represented by an item name "G2", the timing of a driving signal TX3 is represented by an item name "G3", and the timing of a driving signal TX4 is represented by an item name "G4". In addition, the driving signal TX1 is a signal for driving the readout gate transistor G1. The same applies to the driving signals TX2, TX3, and TX4.

The vertical scanning circuit 323 accumulates the charge in the charge accumulation units CS1, CS2, CS3, and CS4 in this order in synchronization with the irradiation with the light pulse PO.

Part (a) in FIG. 4 shows an example of the driving timing of the distance measurement in the first sub-frame period and the second sub-frame period for generating the first distance image and the second distance image.

As shown in part (a) in FIG. 4, in the first sub-frame period and the second sub-frame period, the timing control unit 41 turns on the readout gate transistor G1 that accumulates charge in the charge accumulation unit CS1 with the irradiation with the light pulse PO. Then, the timing control unit 41 turns on the readout gate transistor G2 that accumulates charge in the charge accumulation unit CS2, the readout gate transistor G3 that accumulates charge in the charge accumulation unit CS3, and the readout gate transistor G4 that accumulates charge in the charge accumulation unit CS4 in order.

In the example shown in part (a) in FIG. 4, since the object OB is present at a close distance, the reflected light RL of the light pulse PO is received at the accumulation timing of the readout gate transistor G1 and the readout gate transistor G2.

In addition, part (b) in FIG. 4 is an example of the driving timing of the distance measurement in the third sub-frame period for generating the third distance image and shows an example of the timing of the range shift driving.

As shown in part (b) in FIG. 4, in the third sub-frame period, with the irradiation with the light pulse PO, the timing control unit 41 turns on the readout gate transistor G1 that accumulates charge in the charge accumulation unit CS1 after a delay period DLY from the irradiation with the light pulse PO. Then, the timing control unit 41 turns on the readout gate transistor G2 that accumulates charge in the charge accumulation unit CS2, the readout gate transistor G3 that accumulates charge in the charge accumulation unit CS3, and the readout gate transistor G4 that accumulates charge in the charge accumulation unit CS4 in order.

In this case, since the accumulation timing is delayed by the range shift driving such that the charge caused by a flare is not accumulated in the charge accumulation unit CS, the reflected light RL from the object OB at the close distance is received before the readout gate transistor G1 is turned on, and no charge is accumulated in the charge accumulation unit CS1.

The vertical scanning circuit 323 repeats the above-described driving the number of times corresponding to a predetermined number of distribution operations in each sub-frame period. Then, the vertical scanning circuit 323 outputs the voltage signal corresponding to the amount of charge distributed to each charge accumulation unit CS. Specifically, the vertical scanning circuit 323 turns on the select gate transistor SL1 for a predetermined period of time to output the voltage signal corresponding to the amount of charge accumulated in the charge accumulation unit CS1 from the output terminal OUT1 through the pixel signal readout unit RU1. Similarly, the vertical scanning circuit 323 sequentially turns on the select gate transistors SL2 and SL3 to output the voltage signals corresponding to the amounts of charge accumulated in the charge accumulation units CS2 and CS3 from the output terminals OUT2 and OUT3. Then, the electric signal corresponding to the amount of charge for each sub-frame period, which is accumulated in each charge accumulation unit CS, is output to the distance measurement unit 42 through the pixel signal processing circuit 325 and the horizontal scanning circuit 324.

The distance measurement unit 42 calculates a delay time Td with Expression (1) using this principle in the short-distance light receiving pixel according to the related art. Further, Expression (1) is made on the premise that the amount of charge corresponding to an external light component among the amounts of charge accumulated in the charge accumulation units CS1 and CS2 is the same as the amount of charge accumulated in the charge accumulation unit CS3.

$$Td = To \times (Q2 - Q3)/(Q1 + Q2 - 2 \times Q3) \quad (1)$$

where To is a period during which the light pulse PO is emitted,

Q1 is the amount of charge accumulated in the charge accumulation unit CS1,

Q2 is the amount of charge accumulated in the charge accumulation unit CS2, and

Q3 is the amount of charge accumulated in the charge accumulation unit CS3.

In the short-distance light receiving pixel, the distance measurement unit 42 multiplies the delay time Td calculated by Expression (1) by the speed of light (speed) to calculate the round-trip distance to the object OB. Then, the distance measurement unit 42 divides the calculated round-trip distance by half to measure the distance to the object OB.

Next, the details of the first distance image, the second distance image, the third distance image, and the final distance image obtained by combining these images will be described with reference to FIGS. 5 to 8.

First, the object OB to be used for description in the present embodiment will be described with reference to FIG. 5.

Figure 5:
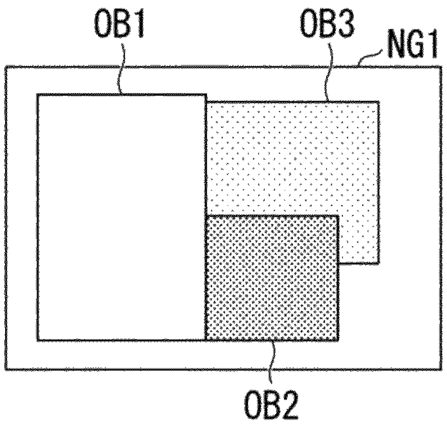
FIG. 5 is a diagram showing a normal image showing an example of an object in the present embodiment.

FIG. 5 is a diagram showing a normal image showing an example of the object OB in the present embodiment.

As shown in FIG. 5, the object OB in the present embodiment includes a short-distance high-reflectivity object OB1, a short-distance low-reflectivity object OB2, and a long-distance object OB3.

In addition, an image NG1 shown in FIG. 5 is a normal captured image NG1 (normal image) obtained by imaging the object OB including the object OB1, the object OB2, and the object OB3.

Figure 6:
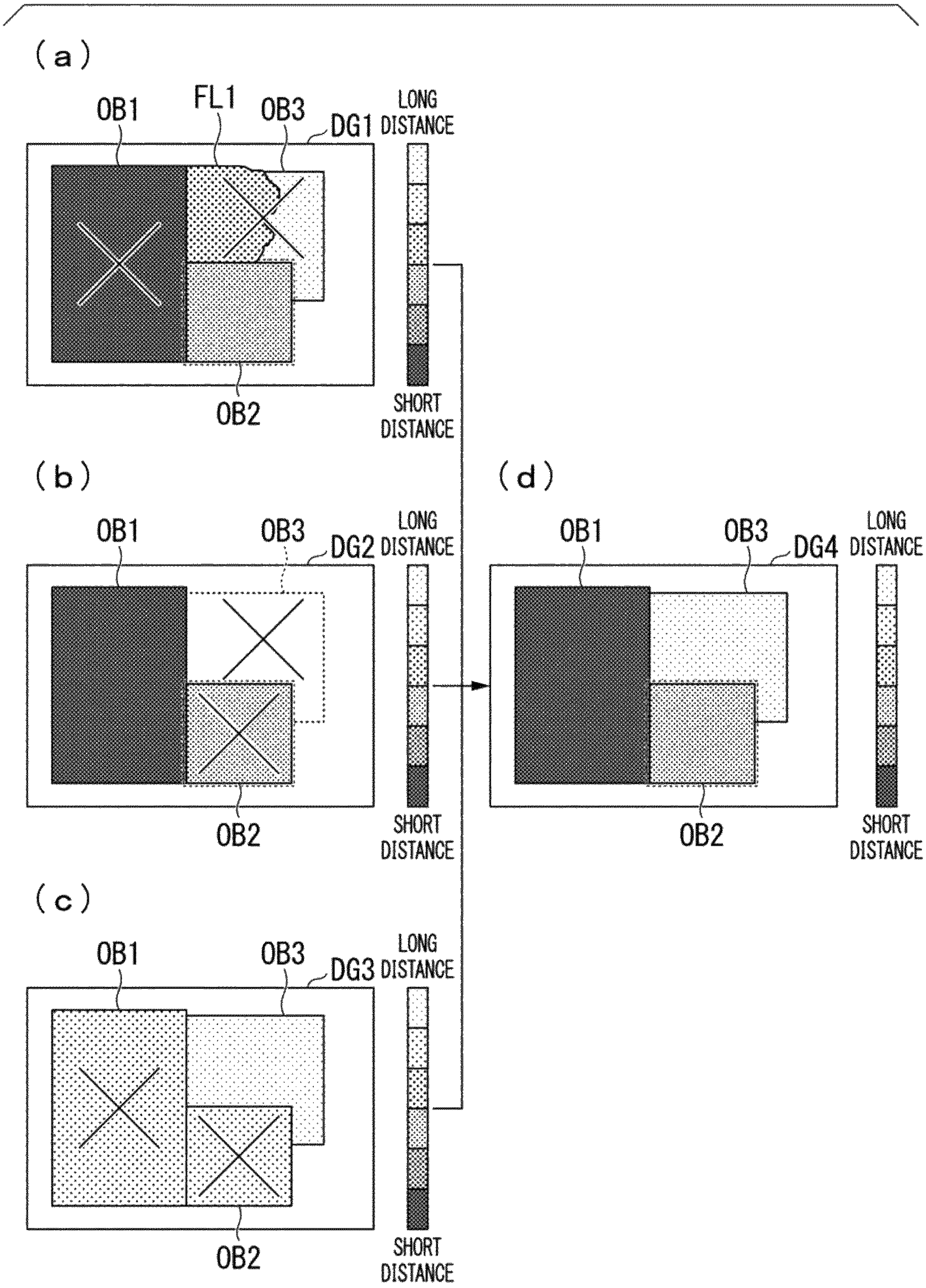
FIG. 6 is a diagram showing an example of a combination of distance images of the distance image capturing device according to the present embodiment.

Next, FIG. 6 is a diagram showing an example of the combination of the distance images of the distance image capturing device 1 according to the present embodiment.

Part (a) in FIG. 6 shows a first distance image DG1, and the measurement control unit 43 of the distance image processing unit 4 generates the first distance image DG1, for example, using the timing control shown in part (a) in FIG. 4 under the condition in which the number of times charge is accumulated is 100,000. Further, in the first distance image DG1, a flare FL1 occurs, and it is not possible to accurately measure the distance to the long-distance object OB3 due to the influence of the flare FL1. In addition, for the short-distance high-reflectivity object OB1, the amount of charge accumulated is saturated, and it is not possible to accurately measure the distance to the short-distance high-reflectivity object OB1. Further, in the first distance image DG1, it is possible to accurately measure the distance to the short-distance low-reflectivity object OB2.

In addition, part (b) in FIG. 6 shows a second distance image DG2, and the measurement control unit 43 generates the second distance image DG2, for example, using the timing control shown in part (a) in FIG. 4 under the condition that the number of times charge is accumulated is 10,000. Furthermore, in the second distance image DG2, since the number of times charge is accumulated is reduced to 10,000, the occurrence of the flare FL1 is suppressed. However, it is not possible to accurately measure the distances to the short-distance low-reflectivity object OB2 and the long-distance object OB3 since the amount of charge accumulated is reduced. Further, in the second distance image DG2, it is possible to accurately measure the distance to the short-distance high-reflectivity object OB1.

In addition, part (c) in FIG. 6 shows a third distance image DG3, and the measurement control unit 43 generates the third distance image DG3, for example, using the timing control (range shift driving) shown in part (b) in FIG. 4 under the condition that the number of times charge is accumulated is 100,000. Further, in the third distance image DG3, it is not possible to accurately measure the distances to the short-distance high-reflectivity object OB1 and the short-distance low-reflectivity object OB2 due to the range shift driving. Furthermore, in the third distance image DG3, it is possible to accurately measure the distance to the long-distance object OB3.

In addition, part (d) in FIG. 6 shows a distance image DG4 obtained by combining the first distance image DG1, the second distance image DG2, and the third distance image DG3. The measurement control unit 43 combines portions, in which the distances can be accurately measured, in each of the first distance image DG1, the second distance image DG2, and the third distance image DG3 to generate the final distance image DG4.

Next, a process of combining the distance image DG4 will be described in detail with reference to FIGS. 7 and 8.

Figure 7:
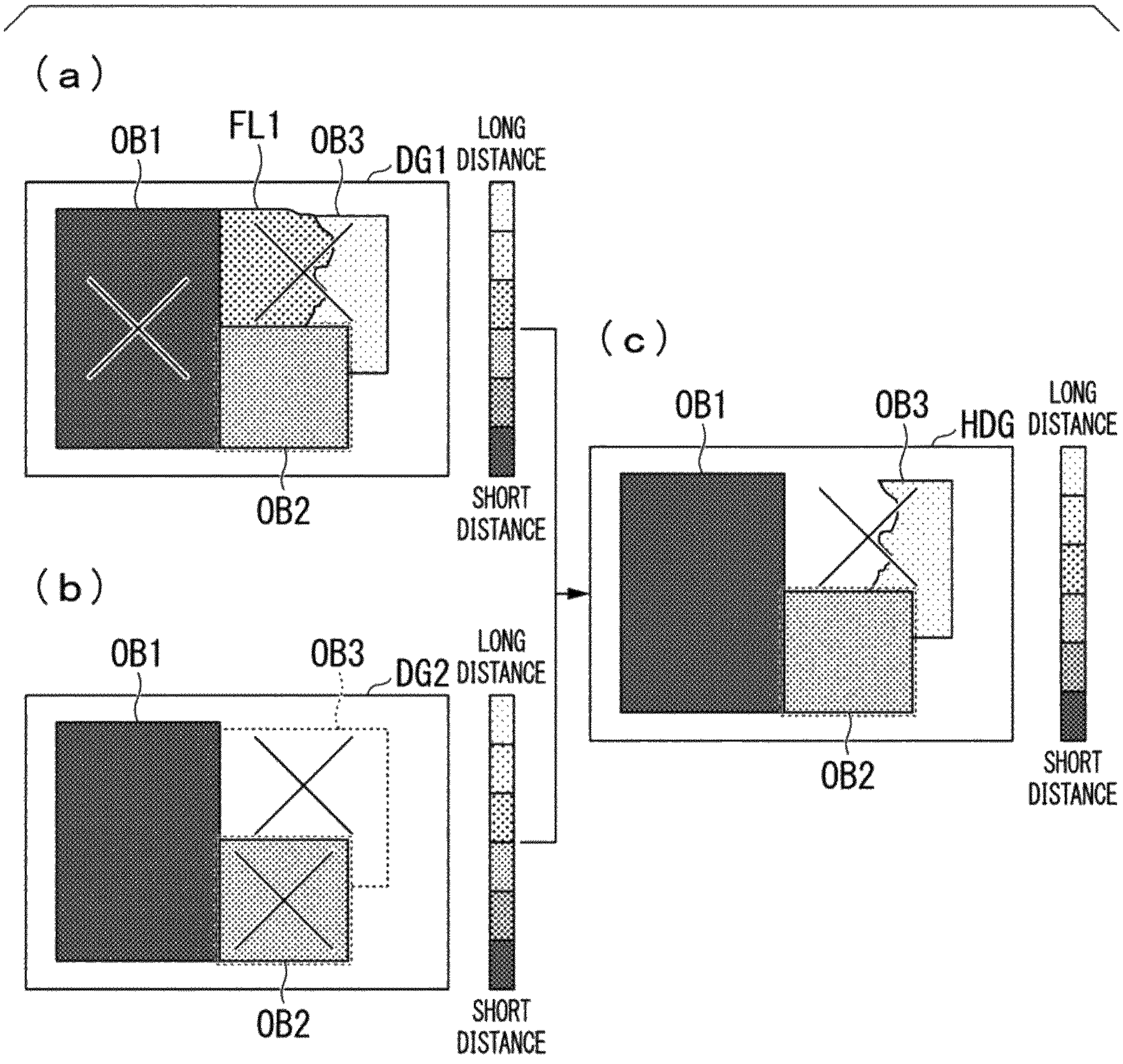
FIG. 7 is a diagram showing an example of generation of an HDR distance image of the distance image capturing device according to the present embodiment.

FIG. 7 is a diagram showing an example of the combination of an HDR distance image of the distance image capturing device 1 according to the present embodiment.

Part (a) in FIG. 7 shows the first distance image DG1, and part (b) in FIG. 7 shows the second distance image DG2. In addition, part (c) in FIG. 7 shows an HDR distance image HDG.

As shown in FIG. 7, the distance image processing unit 4 (measurement control unit 43) combines the first distance image DG1 and the second distance image DG2 using high dynamic range (HDR) to generate the HDR distance image HDG.

In addition, in the HDR distance image HDG, it is not possible to accurately measure the distance of a portion of the long-distance object OB3 due to the influence of the flare FL1.

Figure 8:
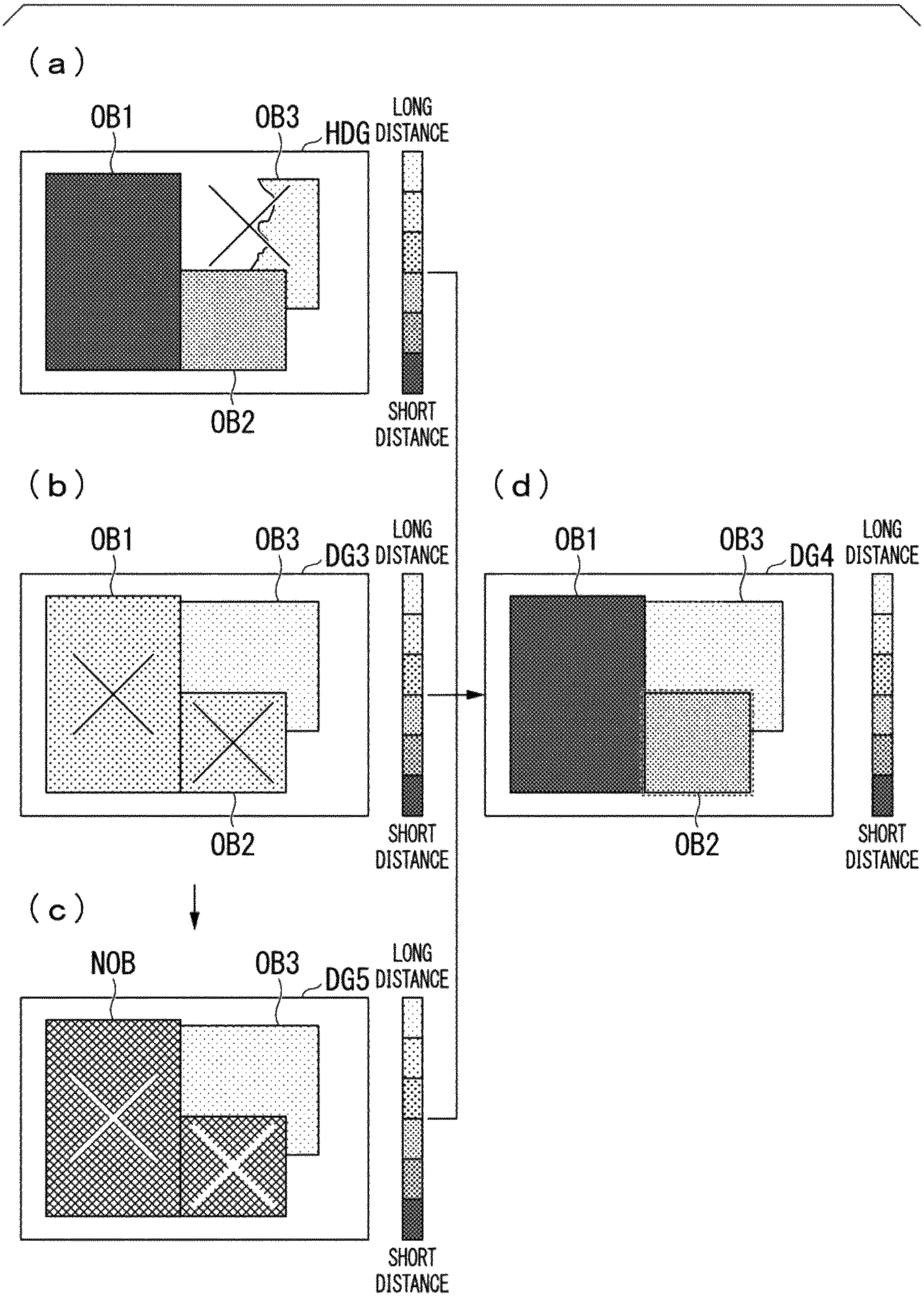
FIG. 8 is a diagram showing an example of a combination of the HDR distance image and a distance image by range shift driving in the distance image capturing device according to the present embodiment.

Then, as shown in FIG. 8, the distance image processing unit 4 (measurement control unit 43) combines the generated HDR distance image HDG and the third distance image DG3 to generate the final distance image DG4.

FIG. 8 is a diagram showing an example of the combination of the HDR distance image HDG and the third distance image DG3 by the range shift driving in the distance image capturing device 1 according to the present embodiment.

Part (a) in FIG. 8 shows the HDR distance image HDG, and part (b) in FIG. 8 shows the third distance image DG3. In addition, part (c) in FIG. 8 shows a distance image DG5 obtained by determining a short-distance pixel for the third distance image DG3, and part (d) in FIG. 8 shows the final distance image DG4.

The distance image processing unit 4 (measurement control unit 43) first determines whether or not each pixel 321 is a short-distance pixel whose distance is equal to or less than a threshold value for the third distance image DG3 and generates the distance image DG5 obtained by determining the short-distance pixel. For example, the measurement control unit 43 determines whether or not each pixel is the short-distance pixel according to whether or not a distance calculation error has occurred. Here, the distance calculation error is, for example, a case where charge is accumulated only at the timing G1 shown in part (b) in FIG. 4 (for example, a case where the amount of charge accumulated at the timing G1 has the largest value and is equal to or greater than a threshold value).

The measurement control unit 43 determines whether or not each pixel is the short-distance pixel and generates the distance image DG5 shown in part (c) in FIG. 8 obtained by determining the short-distance pixel.

In addition, in the distance image DG5 shown in part (c) in FIG. 8 obtained by determining the short-distance pixel, a region NOB of the short-distance high-reflectivity object OB1 and the short-distance low-reflectivity object OB2 is determined to be the short-distance pixels.

Then, the measurement control unit 43 combines the HDR distance image HDG and the distance image DG5 obtained by determining the short-distance pixel. The measurement control unit 43 selects the pixel value of the HDR distance image HDG in a case where the pixel 321 is the short-distance pixel, selects the pixel value of the third distance image DG3 (distance image DG5) in a case where the pixel 321 is not the short-distance pixel, but is the long-distance pixel, and combines the pixel values to generate the distance image DG4.

In the example shown in FIG. 8, the measurement control unit 43 adopts the pixel value of the HDR distance image HDG for the pixel 321 in the region NOB of the distance image DG5, adopts the pixel value of the third distance image DG3 (distance image DG5) for the pixel 321 in the other region (the region of the long-distance object OB3), and combines the pixel values. As a result, the measurement control unit 43 generates the distance image DG4 shown in part (d) in FIG. 8.

Next, the operation of the distance image capturing device 1 according to the present embodiment will be described with reference to the drawings.

Figure 9:
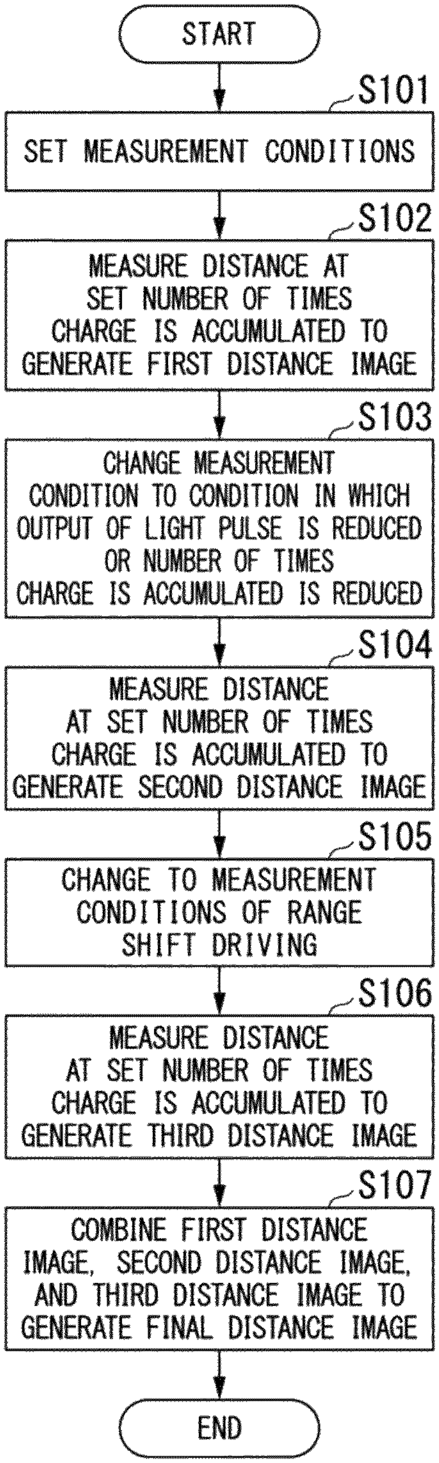
FIG. 9 is a flowchart showing an example of an operation of the distance image capturing device according to the present embodiment.

FIG. 9 is a flowchart showing an example of the operation of the distance image capturing device 1 according to the present embodiment.

As shown in FIG. 9, first, the distance image processing unit 4 of the distance image capturing device 1 sets measurement conditions (Step S101). The measurement control unit 43 of the distance image processing unit 4 directs the timing control unit 41 to set a predetermined measurement condition (for example, the number of times charge is accumulated is 100,000, or the like) of the first sub-frame period.

Then, the measurement control unit 43 measures the distance at the set number of times charge is accumulated to generate the first distance image DG1 (Step S102). The measurement control unit 43 executes the measurement using the timing control unit 41 and measures the distance of each pixel 321 using the distance measurement unit 42 to generate, for example, the first distance image DG1 shown in part (a) in FIG. 6. The measurement control unit 43 stores measurement data for generating the first distance image DG1 and the first distance image DG1 in the measurement storage unit 44.

Then, the measurement control unit 43 changes the measurement condition to a condition in which the output of the light pulse PO is reduced or the number of times charge is accumulated is reduced (Step S103). The measurement control unit 43 directs the timing control unit 41 to set, for example, the measurement condition of the second sub-frame period in which the number of times charge is accumulated is reduced to 10,000.

Then, the measurement control unit 43 measures the distance at the set number of times charge is accumulated to generate the second distance image DG2 (Step S104). The measurement control unit 43 executes the measurement using the timing control unit 41 and measures the distance of each pixel 321 using the distance measurement unit 42 to generate, for example, the second distance image DG2 shown in part (b) in FIG. 6. The measurement control unit 43 stores measurement data for generating the second distance image DG2 and the second distance image DG2 in the measurement storage unit 44.

Then, the measurement control unit 43 changes the measurement condition to the measurement condition of the range shift driving (Step S105). The measurement control unit 43 directs the timing control unit 41 to, for example, return the number of times charge is accumulated to 100,000, to set the delay period DLY shown in part (b) in FIG. 4, and to set the measurement condition of the third sub-frame period.

Then, the measurement control unit 43 measures the distance at the set number of times charge is accumulated to generate the third distance image DG3 (Step S106). The measurement control unit 43 executes the measurement using the timing control unit 41 and measures the distance of each pixel 321 using the distance measurement unit 42 to generate, for example, the third distance image DG3 shown in part (c) in FIG. 6. The measurement control unit 43 stores measurement data for generating the third distance image DG3 and the third distance image DG3 in the measurement storage unit 44.

Then, the measurement control unit 43 combines the first distance image DG1, the second distance image DG2, and the third distance image DG3 to generate the final distance image DG4 (Step S107). The measurement control unit 43 generates, for example, the final distance image DG4 shown in part (d) in FIG. 6 using the information stored in the measurement storage unit 44. After the process in Step S107, the measurement control unit 43 ends the process.

Next, the details of the process in Step S107 shown in FIG. 9 will be described with reference to FIG. 10.

Figure 10:
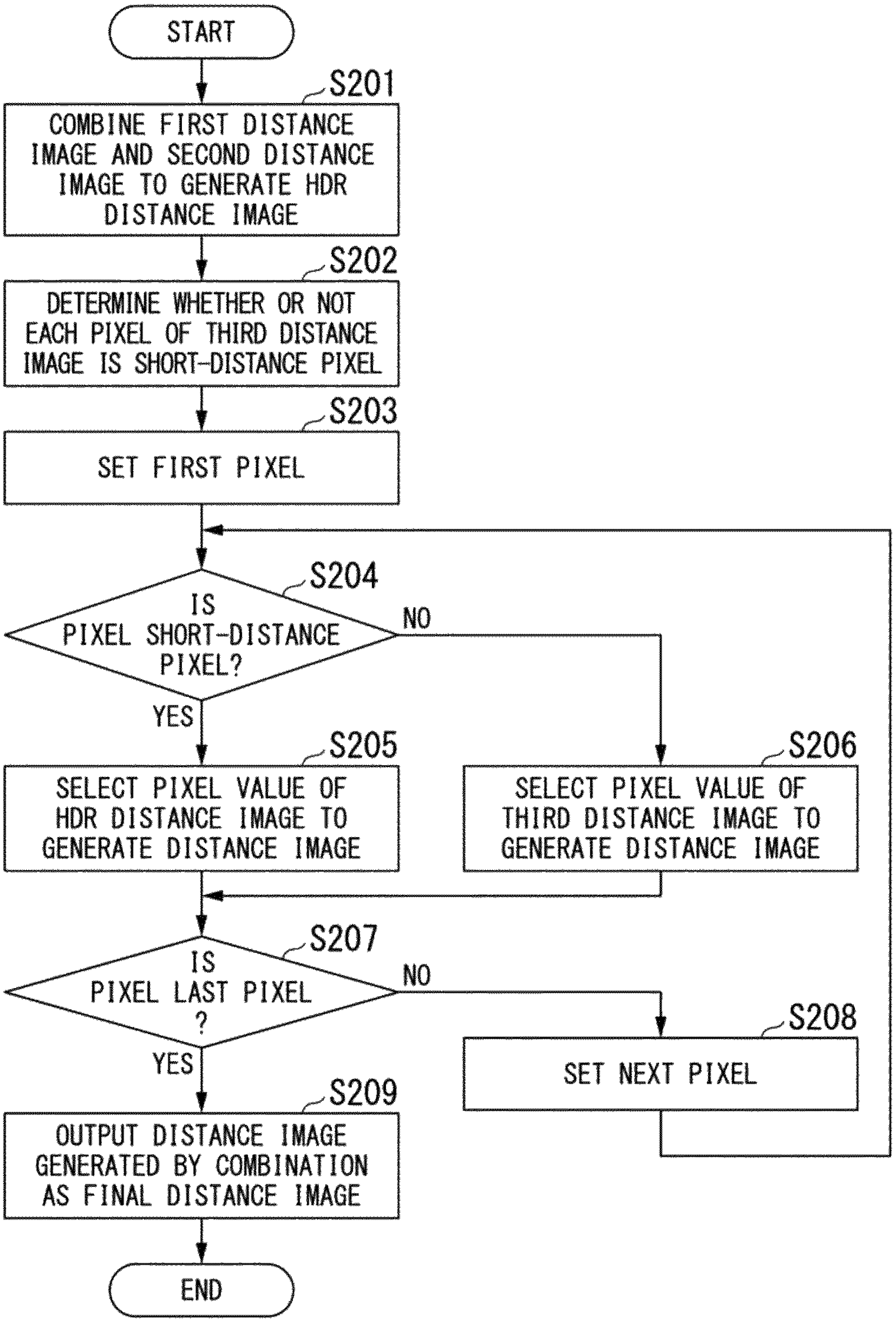
FIG. 10 is a flowchart showing an example of a process of combining the HDR distance image and the distance image by the range shift driving in the distance image capturing device according to the present embodiment.

FIG. 10 is a flowchart showing an example of a process of combining the HDR distance image HDG and the distance image (third distance image DG3) by the range shift driving in the distance image capturing device 1 according to the present embodiment.

As shown in FIG. 10, first, the measurement control unit 43 combines the first distance image DG1 and the second distance image DG2 to generate the HDR distance image HDG (Step S201). For example, the measurement control unit 43 generates the HDR distance image HDG using the information stored in the measurement storage unit 44 as shown in FIG. 7. The measurement control unit 43 stores the generated HDR distance image HDG in the measurement storage unit 44.

Then, the measurement control unit 43 determines whether or not each pixel of the third distance image DG3 is the short-distance pixel (Step S202). For example, the measurement control unit 43 generates the distance image DG5 shown in part (c) in FIG. 8 obtained by determining the short-distance pixel and stores the distance image DG5 in the measurement storage unit 44.

Then, the measurement control unit 43 sets the first pixel 321 (Step S203). The measurement control unit 43 sets the first pixel 321 for generating the final distance image DG4.

Then, the measurement control unit 43 determines whether or not the pixel 321 is the short-distance pixel (Step S204). The measurement control unit 43 determines whether or not the set pixel 321 is the short-distance pixel using the distance image DG5 obtained by determining the short-distance pixel. In a case where the pixel 321 is the short-distance pixel (Step S204: YES), the measurement control unit 43 advances the process to Step S205. In addition, in a case where the pixel 321 is not the short-distance pixel (NO in Step S204), the measurement control unit 43 advances the process to Step S206.

In Step S205, the measurement control unit 43 selects the pixel value of the HDR distance image HDG to generate the distance image DG4. The measurement control unit 43 substitutes the pixel value of the corresponding HDR distance image HDG into the target pixel 321 to generate the distance image DG4. After the process in Step S205, the measurement control unit 43 advances the process to Step S207.

In Step S206, the measurement control unit 43 selects the pixel value of the third distance image DG3 to combine the distance image DG4. The measurement control unit 43 substitutes the pixel value of the corresponding third distance image DG3 into the target pixel 321 to combine the distance images DG4. After the process in Step S206, the measurement control unit 43 advances the process to Step S207.

In Step S207, the measurement control unit 43 determines whether or not the pixel is the last pixel. That is, the measurement control unit 43 determines whether or not the currently set pixel 321 is the last pixel of the distance image DG4. In a case where the currently set pixel 321 is the last pixel of the distance image DG4 (YES in Step S207), the measurement control unit 43 advances the process to Step S209. In addition, in a case where the currently set pixel 321 is not the last pixel of the distance image DG4 (NO in Step S207), the measurement control unit 43 advances the process to Step S208.

In Step S208, the measurement control unit 43 sets the next pixel 321. The measurement control unit 43 returns the process to Step S204 after the process in Step S208.

In addition, in Step S209, the measurement control unit 43 outputs the distance image DG4 generated by the combination as the final distance image. After the process in Step S209, the measurement control unit 43 ends the process of combining the HDR distance image HDG and the distance image (third distance image DG3) by the range shift driving.

Next, a modification example of the process of combining the HDR distance image HDG and the distance image (third distance image DG3) by the range shift driving will be described with reference to FIG. 11.

Figure 11:
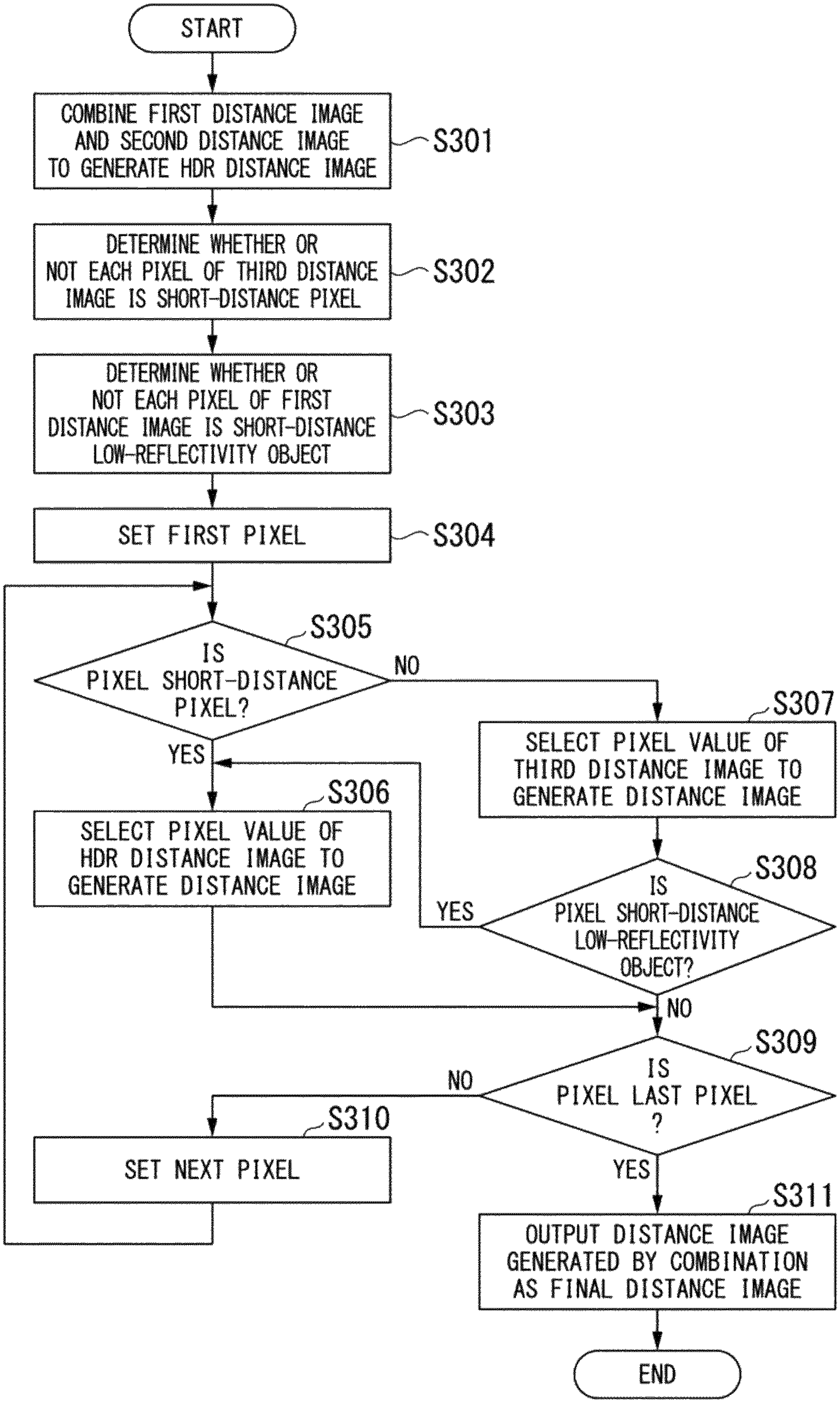
FIG. 11 is a flowchart showing another example of the process of combining the HDR distance image and the distance image by the range shift driving in the distance image capturing device according to the present embodiment.

FIG. 11 is a flowchart showing another example of the process of combining the HDR distance image HDG and the distance image (third distance image DG3) by the range shift driving in the distance image capturing device 1 according to the present embodiment.

The example shown in FIG. 11 is a modification example in which the distance image processing unit 4 determines whether or not each pixel 321 of the first distance image DG1 is the short-distance low-reflectivity object based on the amount of charge accumulated in each of the charge accumulation units CS and selects the pixel value of the HDR distance image HDG for the pixel 321 corresponding to the short-distance low-reflectivity object in the first distance image DG1.

Since the process in Step S301 and Step S302 shown in FIG. 11 is the same as the process in Step S201 and Step S202 shown in FIG. 10, a description thereof will be omitted here.

Then, in Step S303, the measurement control unit 43 determines whether or not each pixel 321 of the first distance image DG1 is the short-distance low-reflectivity object. For example, in a case where an amount of charge Q1 accumulated in the charge accumulation unit CS1 at the timing G1 is equal to or greater than a first threshold value and (the amount of charge Q1/an amount of charge Q2) is equal to or less than a second threshold value, the measurement control unit 43 determines that the pixel is the short-distance low-reflectivity object. Here, the amount of charge Q2 is the amount of charge accumulated in the charge accumulation unit CS2. The measurement control unit 43 determines whether or not all of the pixels 321 of the first distance image DG1 are the short-distance low-reflectivity object. The measurement control unit 43 stores the determination result of each pixel 321 in the measurement storage unit 44.

Since the process from Step S304 to Step S307 and from Step S309 to Step S311 is the same as the process from Step S203 to Step S206 and from Step S207 to Step S209 shown in FIG. 10, a description thereof will be omitted here.

In Step S308, the measurement control unit 43 determines whether or not the pixel 321 is the short-distance low-reflectivity object. The measurement control unit 43 determines whether or not the set pixel 321 is the short-distance low-reflectivity object using the determination result in Step S303 stored in the measurement storage unit 44. In addition, in the example shown in FIG. 6, the pixel 321 corresponding to the short-distance low-reflectivity object OB2 corresponds to the short-distance low-reflectivity object. In a case where the pixel 321 is the short-distance low-reflectivity object (Step S308: YES), the measurement control unit 43 advances the process to Step S306 and selects the pixel value of the HDR distance image HDG to combine the distance image DG4. In addition, in a case where the pixel 321 is not the short-distance low-reflectivity object (NO in Step S308), the measurement control unit 43 advances the process to Step S309.

As described above, the distance image capturing device 1 according to the present embodiment includes the light source unit 2, the light receiving unit 3, and the distance image processing unit 4. The light source unit 2 irradiates the measurement space, which is the measurement target space, with the light pulse PO. The light receiving unit 3 includes the pixel 321 having the photoelectric conversion element PD that generates charge corresponding to incident light and three or more charge accumulation units CS that accumulate the charge, and the pixel driving circuit (vertical scanning circuit 323) that distributes and accumulates the charge to each of the charge accumulation units CS in the pixel 321 at the timing synchronized with the irradiation with the light pulse PO by the frame period. The distance image processing unit 4 controls the irradiation timing when the light pulse PO is emitted and the accumulation timing when the charge is distributed and accumulated in each of the charge accumulation units CS, measures the distance to the object OB present in the measurement space based on the amount of charge accumulated in each of the charge accumulation units CS, and generates the distance image. Then, the distance image processing unit 4 combines the first distance image DG1, the second distance image DG2, and the third distance image DG3 to generate the distance image DG4. The first distance image DG1 is a distance image generated by controlling the light source unit 2 and the pixel driving circuit (vertical scanning circuit 323) under predetermined measurement conditions of the irradiation output of the light pulse PO and the number of times charge is accumulated in the charge accumulation unit CS. In addition, the second distance image DG2 is a distance image generated by changing the predetermined measurement condition such that the amount of charge accumulated is reduced. Further, the third distance image DG3 is a distance image generated by delaying the accumulation timing such that the charge caused by the flare is not accumulated in the charge accumulation unit CS under the predetermined measurement conditions.

Therefore, the distance image capturing device 1 according to the present embodiment selects, for example, the pixel values at which the distance can be correctly measured in the first distance image DG1, the second distance image DG2, and the third distance image DG3 and combines the pixel values, which makes it possible to suppress the influence of the flare and to generate the distance image (for example, the distance image DG4 shown in FIG. 6) in which the distance is correctly measured. Therefore, the distance image capturing device 1 according to the present embodiment can suppress the influence of the flare and improve the accuracy of distance measurement. The distance image capturing device 1 according to the present embodiment can suppress the influence of the flare and improve the accuracy of distance measurement, for example, in a situation in which a high-reflectivity object and a low-reflectivity object are present at the same distance.

In addition, in the present embodiment, the distance image processing unit 4 combines the first distance image and the second distance image using HDR to generate the HDR distance image HDG. The distance image processing unit 4 determines whether or not each pixel 321 is the short-distance pixel whose distance is equal to or less than the threshold value. The distance image processing unit 4 selects the pixel value of the HDR distance image HDG in a case where each pixel 321 is the short-distance pixel, selects the pixel value of the third distance image DG3 in a case where each pixel 321 is not the short-distance pixel, but is the long-distance pixel, and combines the pixel values to generate the distance image.

Therefore, the distance image capturing device 1 according to the present embodiment can generate, for example, the distance image (for example, the distance image DG4 shown in FIG. 6) in which the distance to the long-distance object affected by the flare FL1, such as the long-distance object OB3 in the HDR distance image HDG shown in FIG. 7, has been correctly measured.

In addition, in the present embodiment, in a case where the distance calculation error occurs for each pixel 321 of the third distance image DG3, the distance image processing unit 4 determines that the pixel 321 is the short-distance pixel and selects the pixel value of the HDR distance image HDG for the pixel 321.

Therefore, the distance image capturing device 1 according to the present embodiment can accurately determine whether or not the pixel is the short-distance pixel using a simple method and suppress the influence of the flare to improve the accuracy of distance measurement.

In addition, in the present embodiment, the distance image processing unit 4 determines whether or not each pixel 321 of the first distance image DG1 is the short-distance low-reflectivity object based on the amount of charge accumulated in each of the charge accumulation units CS. Further, the distance image processing unit 4 selects the pixel value of the HDR distance image HDG for the pixel 321 corresponding to the short-distance low-reflectivity object in the first distance image DG1.

Therefore, the distance image capturing device 1 according to the present embodiment can accurately distinguish the short-distance low-reflectivity object OB2 from the long-distance object OB3 and suppress the influence of the flare to improve the accuracy of distance measurement.

In addition, in the present embodiment, the distance image processing unit 4 reduces the irradiation intensity of the light pulse PO or the number of times charge is accumulated from the predetermined measurement conditions to generate the second distance image DG2.

Therefore, the distance image capturing device 1 according to the present embodiment can easily generate the second distance image DG2 obtained by reducing the amount of charge accumulated to suppress the influence of the flare FL1.

In addition, in the present embodiment, the frame period includes a plurality of (for example, three) sub-frame periods configured by the accumulation period and the reading period for reading the amount of charge accumulated in the charge accumulation unit CS during the accumulation period. The plurality of sub-frame periods include the first sub-frame period for generating the first distance image DG1, the second sub-frame period for generating the second distance image DG2, and the third sub-frame period for generating the third distance image DG3.

Therefore, the distance image capturing device 1 according to the present embodiment can easily and appropriately generate the first distance image DG1, the second distance image DG2, and the third distance image DG3.

In addition, a distance image capturing method according to the present embodiment is a distance image capturing method in the distance image capturing device 1 and includes a first generation step, a second generation step, a third generation step, and a combination step. Here, the distance image capturing device 1 includes the light source unit 2, the light receiving unit 3, and the distance image processing unit 4. The light source unit 2 irradiates the measurement space, which is the measurement target space, with the light pulse PO. The light receiving unit 3 includes the pixel 321 having the photoelectric conversion element PD that generates charge corresponding to incident light and three or more charge accumulation units CS that accumulate the charge, and the pixel driving circuit (vertical scanning circuit 323) that distributes and accumulates the charge to each of the charge accumulation units CS in the pixel 321 at the timing synchronized with the irradiation with the light pulse PO by the frame period. The distance image processing unit 4 controls the irradiation timing when the light pulse PO is emitted and the accumulation timing when the charge is distributed and accumulated in each of the charge accumulation units CS, measures the distance to the object OB present in the measurement space based on the amount of charge accumulated in each of the charge accumulation units CS, and generates the distance image. Then, in the first generation step, the distance image processing unit 4 controls the light source unit 2 and the pixel driving circuit (vertical scanning circuit 323) under the predetermined measurement conditions of the irradiation output of the light pulse PO and the number of times charge is accumulated in the charge accumulation unit CS such that the first distance image DG1 is generated. In the second generation step, the distance image processing unit 4 changes the predetermined measurement conditions such that the amount of charge accumulated is reduced to generate the second distance image DG2. In the third generation step, the distance image processing unit 4 delays the accumulation timing such that the charge caused by the flare is not accumulated in the charge accumulation unit CS under the predetermined measurement conditions to generate the third distance image DG3. In the combination step, the distance image processing unit 4 combines the first distance image, the second distance image, and the third distance image to generate the distance image.

Therefore, the distance image capturing method according to the present embodiment has the same effect as the distance image capturing device 1, and it is possible to suppress the influence of the flare and to improve the accuracy of distance measurement.

In addition, the present invention is not limited to each of the above-described embodiments and can be modified without departing from the gist of the present invention.

For example, in each of the above-described embodiments, the example has been described in which the distance image processing unit 4 combines the first distance image DG1 and the second distance image DG2 to generate the HDR distance image HDG and then combines the HDR distance image HDG and the third distance image DG3 to generate the final distance image DG4. However, the present invention is not limited thereto. For example, the distance image processing unit 4 may not generate the HDR distance image HDG, may select the pixel values at which the distance can be most accurately measured from the first distance image DG1, the second distance image DG2, and the third distance image DG3, and may combine the pixel values. Alternatively, the distance image processing unit 4 may combine the pixel values using other methods.

In addition, in each of the above-described embodiments, the example has been described in which a change in the measurement conditions, the distance measurement, and the generation of the distance image are performed in the order of the first distance image DG1, the second distance image DG2, and the third distance image DG3. However, the present invention is not limited thereto, and the distance measurement and the generation of the distance image may be performed in a different order.

Further, in each of the above-described embodiments, the example has been described in which the final distance image is combined from the first distance image DG1, the second distance image DG2, and the third distance image DG3 (the distance images acquired in three sub-frames). However, the present invention is not limited thereto. The distance image capturing device 1 may generate the final distance image from four or more distance images. For example, the number of distance images obtained by driving, in which the number of times charge is accumulated is changed, may be further increased, the distance images captured using a dot light source may be used, or the like.

In addition, in each of the above-described embodiments, the example in which the number of times charge is accumulated is reduced has been described as an example in which the amount of charge accumulated is reduced. However, the present invention is not limited thereto. The irradiation intensity (irradiation power) of the light pulse PO may be reduced, or other methods may be applied.

Further, in each of the above-described embodiments, the example of the case where the number of light sources in the light source unit 2 is one has been described. However, the present invention is not limited thereto. For example, a plurality of light sources may be used. In addition, the light source unit 2 may be, for example, another light source such as a dot light source, a wide-angle light source, a high-power light source, or the like.

Furthermore, in the above-described embodiments, the example in which the pixel 321 has three charge accumulation units CS and the example in which the pixel 321 has four charge accumulation units CS have been described. However, the present invention is not limited thereto. The pixel 321 may have other forms as long as the pixel 321 includes three or more charge accumulation units CS.

In addition, each configuration included in the distance image capturing device 1 has a computer system therein. Then, a program for implementing the functions of each configuration included in the distance image capturing device 1 may be recorded in a computer-readable recording medium, and the computer system may read the program recorded in the recording medium and execute the program to perform the processes in each configuration included in the distance image capturing device 1. Here, the configuration "the computer system reads the program recorded in the recording medium and executes the program" includes installing the program in the computer system. Here, it is assumed that the term "computer system" described here includes an OS and hardware such as a peripheral device.

In addition, the "computer system" may include a plurality of computer devices connected via a network including a communication line such as the Internet, a WAN, a LAN, a dedicated line, or the like. In addition, the term "computer-readable recording medium" means a storage device, for example, a portable medium, such as a flexible disk, a magneto-optical disk, a ROM, a CD-ROM, or the like, or a hard disk or the like provided in the computer system. Further, the recording medium storing the program may be a non-transitory recording medium such as a CD-ROM or the like.

Furthermore, the recording medium also includes an internal or external recording medium that is accessible by a distribution server for distributing the program. Moreover, the program may be divided into a plurality of parts, and the plurality of parts may be downloaded at different timings and then combined in each configuration included in the distance image capturing device 1. Alternatively, distribution servers that distribute the divided parts of the program may be different from each other. Furthermore, the "computer-readable recording medium" also includes a medium that retains the program for a certain period of time such as a volatile memory (RAM) provided in a computer system that serves as a server or a client in a case where the program is transmitted via the network. Moreover, the above-described program may be a program for implementing some of the above-mentioned functions.

Further, the program may be a so-called difference file (difference program) that can implement the above-described functions in combination with a program already recorded in the computer system.

In addition, some or all of the above-described functions may be implemented as an integrated circuit such as a large scale integration (LSI) or the like. Each of the above-described functions may be individually integrated into a processor, or some or all of the above-described functions may be integrated into a processor. Further, a method for making an integrated circuit is not limited to the LSI, but may be implemented by a dedicated circuit or a general-purpose processor. In addition, in a case where an integrated circuit making technology that replaces the LSI appears with advances in semiconductor technology, an integrated circuit based on the technology may be used.

While preferred embodiments of the invention have been described and illustrated above, it should be understood that these are exemplary of the invention and are not to be considered as limiting. Additions, omissions, substitutions, and other modifications can be made without departing from the scope of the invention defined by the appended claims. Accordingly, the invention is not to be considered as being limited by the foregoing description and is only limited by the scope of the appended claims.

What is claimed is:

1. A distance image capturing device comprising:

a light source unit that irradiates a measurement space, which is a measurement target space, with a light pulse;

a light receiving unit that includes a pixel having a photoelectric conversion element which generates charge corresponding to incident light and three or more charge accumulation units which accumulate the charge and a pixel driving circuit which distributes and accumulates the charge in each of the charge accumulation units in the pixel at a timing synchronized with the irradiation with the light pulse by a frame period; and a distance image processing circuitry that controls an irradiation timing when the light pulse is emitted and an accumulation timing when the charge is distributed and accumulated in each of the charge accumulation units, measures a distance to an object that is present in the measurement space based on an amount of charge accumulated in each of the charge accumulation units, and generates a distance image, wherein the distance image processing circuitry combines a first distance image generated by controlling the light source unit and the pixel driving circuit under predetermined measurement conditions of an irradiation output of the light pulse and a number of times the charge is accumulated in the charge accumulation unit, a second distance image generated by changing the predetermined measurement conditions such that the amount of charge accumulated is reduced, and a third distance image generated by delaying the accumulation timing such that charge caused by a flare is not accumulated in the charge accumulation unit under the predetermined measurement conditions to generate the distance image.

2. The distance image capturing device according to claim 1, wherein the distance image processing circuitry combines the first distance image and the second distance image using high dynamic range (HDR) to generate an HDR distance image, determines whether or not each pixel is a short-distance pixel whose distance is equal to or less than a threshold value, selects a pixel value of the HDR distance image in a case where the pixel is the short-distance pixel, selects a pixel value of the third distance image in a case where the pixel is not the short-distance pixel, but is a long-distance pixel, and combines the pixel values to generate the distance image.

3. The distance image capturing device according to claim 2, wherein the distance image processing circuitry reduces an irradiation intensity of the light pulse or the number of times the charge is accumulated from the predetermined measurement conditions to generate the second distance image.

4. The distance image capturing device according to claim 2, wherein, in a case where a distance calculation error occurs for each pixel of the third distance image, the distance image processing circuitry determines that the pixel of the third distance image is the short-distance pixel and selects the pixel value of the HDR distance image for the pixel.

5. The distance image capturing device according to claim 4, wherein the distance image processing circuitry reduces an irradiation intensity of the light pulse or the number of times the charge is accumulated from the predetermined measurement conditions to generate the second distance image.

6. The distance image capturing device according to claim 3, wherein the distance image processing circuitry determines whether or not each pixel of the first distance image is a short-distance low-reflectivity object based on the amount of charge accumulated in each of the charge accumulation units and further selects the pixel value of the HDR distance image for a pixel corresponding to the short-distance low-reflectivity object in the first distance image.

7. The distance image capturing device according to claim 6, wherein the distance image processing circuitry reduces an irradiation intensity of the light pulse or the number of times the charge is accumulated from the predetermined measurement conditions to generate the second distance image.

8. The distance image capturing device according to claim 1, wherein the distance image processing circuitry reduces an irradiation intensity of the light pulse or the number of times the charge is accumulated from the predetermined measurement conditions to generate the second distance image.

9. The distance image capturing device according to claim 8, wherein the frame period includes a plurality of sub-frame periods configured by an accumulation period and a reading period for reading the amount of charge accumulated in the charge accumulation unit during the accumulation period, and the plurality of sub-frame periods include a first sub-frame period for generating the first distance image, a second sub-frame period for generating the second distance image, and a third sub-frame period for generating the third distance image.

10. A distance image capturing method in a distance image capturing device including a light source unit that irradiates a measurement space, which is a measurement target space, with a light pulse, a light receiving unit that includes a pixel having a photoelectric conversion element which generates charge corresponding to incident light and three or more charge accumulation units which accumulate the charge and a pixel driving circuit which distributes and accumulates the charge in each of the charge accumulation units in the pixel at a timing synchronized with the irradiation with the light pulse by a frame period, and a distance image processing circuitry that controls an irradiation timing when the light pulse is emitted and an accumulation timing when the charge is distributed and accumulated in each of the charge accumulation units, measures a distance to an object that is present in the measurement space based on an amount of charge accumulated in each of the charge accumulation units, and generates a distance image, the distance image capturing method comprising:

a first generation step of causing the distance image processing circuitry to control the light source unit and the pixel driving circuit under predetermined measurement conditions of an irradiation output of the light pulse and a number of times the charge is accumulated in the charge accumulation unit to generate a first distance image;

a second generation step of causing the distance image processing circuitry to change the predetermined measurement conditions such that the amount of charge accumulated is reduced to generate a second distance image;

a third generation step of causing the distance image processing circuitry to delay the accumulation timing such that charge caused by a flare is not accumulated in the charge accumulation unit under the predetermined measurement conditions to generate a third distance image; and a combination step of causing the distance image processing circuitry to combine the first distance image, the second distance image, and the third distance image to generate the distance image.

* * * * *